(12) United States Patent
Truax

(10) Patent No.: US 11,788,542 B2
(45) Date of Patent: Oct. 17, 2023

(54) TANDEM SEAL PUMP

(71) Applicant: Banjo Corporation, Crawfordsville, IN (US)

(72) Inventor: Daniel Truax, Crawfordsville, IN (US)

(73) Assignee: Banjo Corporation, Crawfordsville, IN (US)

( * ) Notice: Subject to any disclaimer, the term of this patent is extended or adjusted under 35 U.S.C. 154(b) by 535 days.

(21) Appl. No.: 16/993,417

(22) Filed: Aug. 14, 2020

(65) Prior Publication Data

US 2022/0049711 A1 Feb. 17, 2022

(51) Int. Cl.
| | |
|---|---|
| F04D 29/10 | (2006.01) |
| F04D 13/02 | (2006.01) |
| F04D 29/043 | (2006.01) |
| F16J 15/34 | (2006.01) |
| F04D 29/08 | (2006.01) |

(52) U.S. Cl.
CPC .......... *F04D 29/106* (2013.01); *F04D 13/02* (2013.01); *F04D 29/043* (2013.01); *F04D 29/086* (2013.01); *F16J 15/3484* (2013.01)

(58) Field of Classification Search
CPC .... F16J 15/3484; F16J 15/3464; F04D 13/02; F04D 29/043; F04D 29/106; F04D 9/004; F04D 29/128; F04D 29/20; F04D 29/628; F04D 29/086; F04D 29/08; F04D 29/12; F04D 29/108; F04D 29/126; F04D 29/044

See application file for complete search history.

(56) References Cited

U.S. PATENT DOCUMENTS

| | | | | |
|---|---|---|---|---|
| 2,427,656 A | * | 9/1947 | Blom | F04D 29/167 277/927 |
| 3,801,226 A | * | 4/1974 | Bevan | F04D 29/2227 415/217.1 |
| 4,669,738 A | * | 6/1987 | Netzel | F16J 15/3484 277/374 |
| 5,421,593 A | * | 6/1995 | Aritsubo | F16J 15/3484 277/927 |
| 5,529,315 A | * | 6/1996 | Borrino | F16J 15/004 277/927 |
| 5,553,867 A | * | 9/1996 | Rockwood | F16J 15/406 277/432 |
| 5,727,792 A | * | 3/1998 | Rockwood | F16J 15/406 277/408 |

(Continued)

FOREIGN PATENT DOCUMENTS

WO WO-2012079765 A1 * 6/2012 ........... F04D 29/128

*Primary Examiner* — Dominick L Plakkoottam
(74) *Attorney, Agent, or Firm* — Tucker Ellis LLP; Michael G. Craig; Heather M. Barnes

(57) ABSTRACT

One or more techniques and/or systems are disclosed for a dual tandem seal configuration that can provide a seal around a drive shaft in a pumping apparatus. The pumping apparatus can include an outboard seal radially surrounding an adapter shaft. The outboard seal can be retained in place by a front bracket at a front end of the outboard seal and a retention lip of the adapter shaft at a rear end of the outboard seal. The pumping apparatus can further include an inboard seal radially surrounding the adapter shaft and located between the outboard seal and the pump. The inboard seal can be retained in place by a rear bracket at a front end of the inboard seal.

20 Claims, 3 Drawing Sheets

(56) References Cited

U.S. PATENT DOCUMENTS

| | | | | |
|---|---|---|---|---|
| 5,823,539 | A | * | 10/1998 | Rockwood ............. F16J 15/363 |
| | | | | 415/110 |
| 6,200,086 | B1 | * | 3/2001 | O'Shea ................ F16J 15/3404 |
| | | | | 415/230 |
| 6,315,297 | B1 | * | 11/2001 | Conway ............... F16J 15/3404 |
| | | | | 277/362 |
| 10,337,616 | B2 | * | 7/2019 | Parkin .................. F16J 15/3484 |
| 2005/0158195 | A1 | * | 7/2005 | Peterson ............... F04D 29/126 |
| | | | | 417/423.1 |
| 2012/0063903 | A1 | * | 3/2012 | Fu .......................... F04D 29/20 |
| | | | | 416/174 |
| 2017/0114790 | A1 | * | 4/2017 | Pohler ................... F04D 29/426 |
| 2017/0356453 | A1 | * | 12/2017 | Goldswain ........... F16J 15/3484 |
| 2021/0048036 | A1 | * | 2/2021 | Schnelzer ............. F04D 29/584 |

\* cited by examiner

TANDEM SEAL PUMP

BACKGROUND

Dual mechanical shaft seals are commonly used to prevent release of hazardous chemicals into the environment in the event of a seal failure. Within the context of agricultural transfer pumps, the primary purpose of dual mechanical seals is to protect a pump from damage if it is run dry. Back-to-back seals (also known as opposed seals) have traditionally been the only type of dual mechanical shaft seals used in agricultural transfer pumps.

When compared to back-to-back seals, tandem seals reverse the inside seal so that pressure inside the pump body acts to close the seal faces rather than push them open.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a new configuration for a pump seal. This seal configuration allows for easier installation, higher pressure ratings, and a more reliable seal. As described herein, a tandem seal arrangement reverses the inside seal so that pressure inside the pump body acts to close the seal faces rather than push them open. A tandem seal arrangement can provide significant advantages over existing pump seal technology, for example, because they mitigate problems common to existing dual seal agricultural transfer pumps. Using the seals described herein, for example, failure of seal can be mitigated when blowing a line out with compressed air, which can be a problem with existing back to back seals. In some implementations, the seal spring described herein may not need to counteract the pressure in the pump, so a lighter spring can be used. Using the lighter spring can reduce friction between the seal faces, which can result in longer seal life, less heat generated by the seal, and consequently less power wasted as heat and a longer allowable dry run time without overheating the pump, for example.

In one implementation of a pump apparatus, a power source can comprise a front bracket (e.g., comprising at least a portion of a wet seal reservoir, or buffer fluid reservoir) and a drive shaft extending through the front bracket, wherein the drive shaft is rotatably engaged with the power source. Further, the pump apparatus can comprise a pump having a rear bracket. An adapter shaft can comprise a first portion that radially surrounds the drive shaft and a second portion coupled to a pump shaft coupler. An outboard seal can radially surround the adapter shaft, and the outboard seal can be retained in place by the front bracket at a front end of the outboard seal. Additionally, an inboard seal can radially surround the adapter shaft, and may be located axially between the outboard seal and the pump. The inboard seal can be retained in place by the rear bracket at a front end of the inboard seal.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
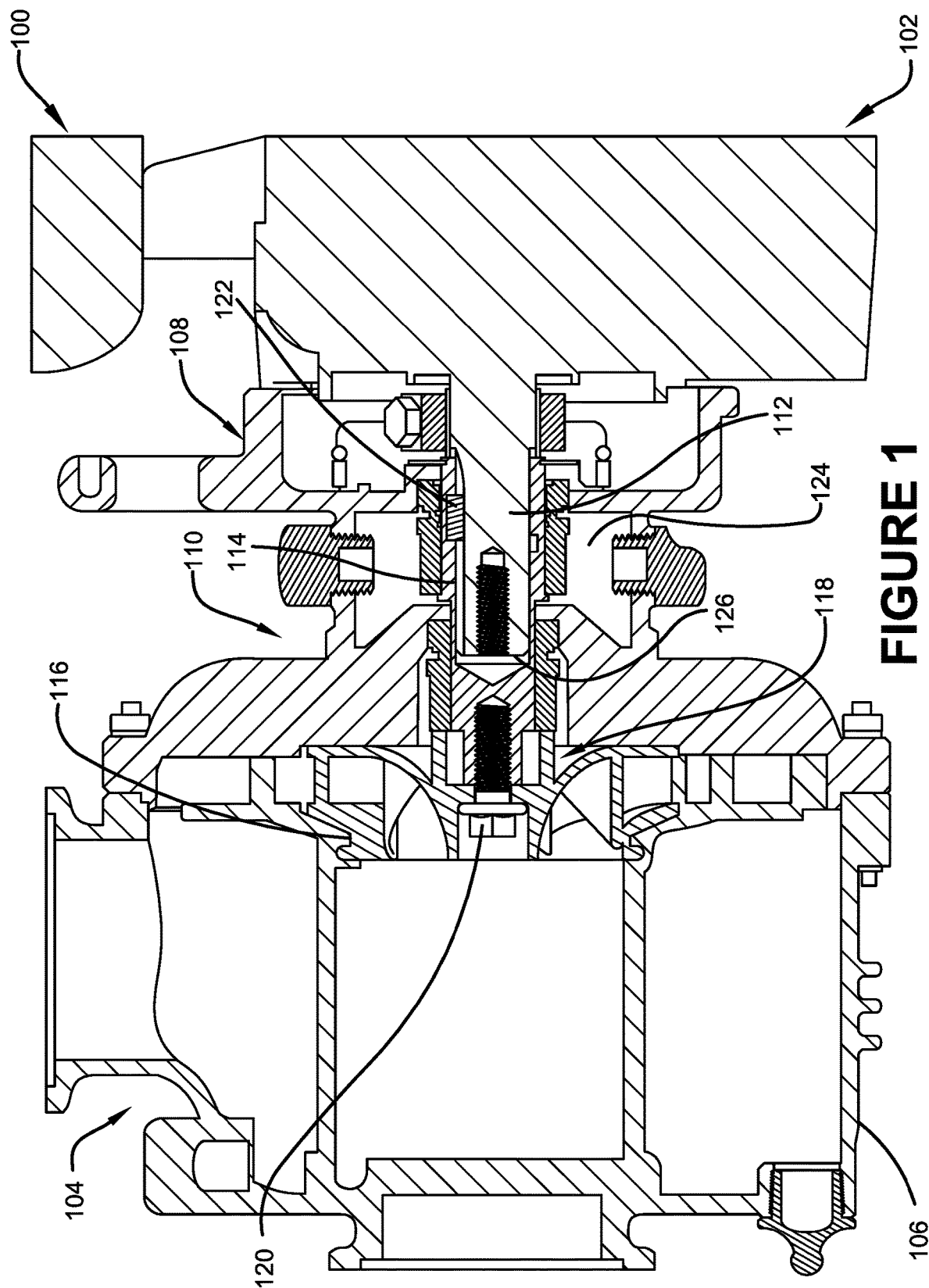
FIG. 1 is a component diagram illustrating one implementation of an example pump operably coupled with a motor, where one or more portions of one or more techniques and/or one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Disclosed is a dual tandem seal configuration that can provide a seal around a drive shaft in a pumping apparatus, such as an agricultural pump. The dual seal configuration can be used, for example, in agricultural transfer pumps and while providing protection against potential damage to the pump during dry runs. That is, for example, sometimes a pump can be operated without fluid flowing through the pump, which may be considered to be a dry run. During dry runs, for example, pump parts can become damaged due to an increase in friction and heat. As disclosed herein, mechanical seals can be used and oriented to mitigate potential damage during a dry run.

In one implementation, a pair of mechanical seals can include an outboard seal and an inboard seal. In this implementation, the pair of seals can be placed axially along and proximate to the drive shaft of the pump, and arranged in a tandem orientation. As an example, the outboard seal and the inboard seal can function as a fail-safe for each other to mitigate leakage of fluids along the shaft. In this implementation, the tandem arrangement of the seals describes an orientation where the seals are disposed front to rear. For example, an engine (e.g., gas, electric, or otherwise powered) is disposed at the front of the pump with the drive shaft extending to the rear into the pump to an impeller. Further, in this implementation, orientation around the drive shaft can be described as inner radial extending radially out to outer radial.

The engine can comprise a drive shaft that is used to power rotation of the pumping mechanism, such as an impeller. In some implementations, the drive shaft can be inserted through a bore disposed at the front of an engine mounting bracket (e.g., engine adapter for coupling the engine with the pump). Further, axially along the drive shaft, an engine adapter can be disposed around a portion of the drive shaft. In some implementations, the adapter shaft can be coupled with the drive shaft in a circumferential chamber used as a fluid reservoir. That is, for example, the fluid reservoir can operably contain a heat regulating and/or lubricating fluid to mitigate heat build-up and/or friction. In these implementations, the adapter shaft can be coupled with the drive shaft to couple to a pumping mechanism. That is, for example, the pump mechanism can comprise a shaft coupler or a driven shaft that operably rotates to rotate the pumping mechanism. In this example, the adapter shaft can be selectively coupled with the pump's shaft coupler or driven shaft, and to the drive shaft. In this way, the engine drive shaft can operably power rotation of the pump's shaft coupler or driven shaft through the adapter shaft, to rotate the pumping mechanism.

In some implementations, a first inner axially oriented component from the drive shaft is the adapter shaft, which can be selectively fixed at the rear end of the drive shaft of the engine. For example, the adapter shaft can be held in place to the drive shaft by a key that is oriented axially along the drive shaft and wedged in position to keep the adapter shaft and drive shaft operably fixed together and engaged during rotational movement of the drive shaft. In this implementation, the adapter shaft can be configured and sized to fit to the shape of the drive shaft, for example, to further extend the length of the drive shaft to the rear of the pump apparatus. In some implementations, the adapter shaft can be radially thicker from the rear end of the drive shaft to the front of the pump coupler. That is, the diameter of the adapter shaft at the front may be greater than the diameter at the rear of the adapter shaft. As an example, the drive shaft with the adapter shaft can extend to the pump coupler or driven shaft.

In some implementations, the pumping apparatus can comprise a rear bracket (e.g., pump bracket), which may be used to couple a pump housing to the engine bracket or adapter. For example, the pump housing can house the pumping mechanism (e.g., impeller) of the pump apparatus. In this implementation, the adapter shaft can extend axially rearward through the pump bracket, and into the pump housing. In one implementation, the adapter shaft can terminate at the pump coupler (e.g., pump adapter), which is fixed to the pumping mechanism. For example, in this implementation, a coupling fastener (e.g., bolt) can selectively engage the pump coupler with the adapter shaft. For example, an impeller bolt can extend axially toward the front, through an impeller into a center axis of the adapter shaft, to fixedly engage the adapter shaft with the impeller.

In some implementations, during assembly of the pumping apparatus, a spacer tool (e.g., long thin tool) can be placed at the mouth of the engine mounting bracket bore, in order to axially orient the engine drive shaft during installation. In this example, the spacer tool can be inserted in a groove in the adapter shaft; and, during installation, the front surface of the engine mounting bracket can come into contact with the spacer tool to indicate an appropriate engine-to-pump mounting position. In this example, the spacer tool is removed from the groove when the engine and pump are operating.

FIG. 1 is a component diagram illustrating one implementation of pumping apparatus 100. Pumping apparatus 100 can comprise a power source 102. The power source 102, for example, can comprise an engine or a motor such as a gas engine, a close coupled gas engine, an electric motor, or a hydraulic motor, a pneumatic motor, among other things. The pumping apparatus 100 can further comprise a pump 104 having a housing 106 that encloses additional pumping mechanisms as described further below. For example, the pump housing 106 can house the pumping mechanism (e.g., impeller) of the pump apparatus 100. In one embodiment, the pump housing 106 may be constructed from a glass reinforced thermoset polyester (e.g. a bulk moulding compound). In another embodiment, the pump housing 106 may be constructed from glass-filled polypropylene. In certain implementations, the pump 104 can comprise tandem seals, and can also be self-priming in certain embodiments. In some implementations, the pumping apparatus 100 can comprise a front bracket 108 (e.g., motor bracket), and a rear bracket 110 (e.g., pump bracket). The rear bracket 110 may be configured to couple the pump housing 106 to the front bracket 108 of the power source 102 or engine/motor adapter.

In this implementation, the power source 102 includes a drive shaft 112 that extends through a bore on the front surface of the pump housing 106 and/or the rear bracket 110. The pumping apparatus 100 can include an adapter shaft 114 that is configured to receive the drive shaft 112 within a cavity 126 inside the adapter shaft 114. The adapter shaft 114 can include one or more keyways that receive a key (e.g. front key 122). The one or more keys are operably oriented axially along the drive shaft and wedged in position to dispose the adapter shaft 114 and drive shaft 112 in an operably fixed coupling and engaged during rotational movement of the drive shaft 112. In some implementations, the adapter shaft 114 can be coupled with the drive shaft 112 at least partially in a circumferential chamber used as a fluid reservoir 124. That is, for example, the fluid reservoir 124 can operably contain a heat regulating and/or lubricating fluid 216 (shown in FIG. 2) to mitigate heat build-up and/or friction. The fluid 216 may be any suitable type of heat regulating and/or lubricating fluid such as oil, water, antifreeze, such as propylene glycol antifreeze, ethylene glycol antifreeze, or a combination of the above. In one embodiment, the fluid 216 can comprise 50% ethylene glycol antifreeze.

The adapter shaft 114 is coupled with a pump shaft coupler 118. The pump shaft coupler 118 receives the rear end of the adapter shaft 114 and can be coupled to the adapter shaft 114 by way of a coupling fastener 120 such as an impeller bolt. The pump 104 further includes an impeller 116 that is coupled to the pump shaft coupler 118. In one embodiment, the impeller 116 is integral with the pump shaft coupler 118. The impeller 116 caps the rear end of the adapter shaft 114 and the coupling fastener 120 extends through the axial center rear surface of the impeller 116 into the axial center of the adapter shaft 114.

Figure 2:
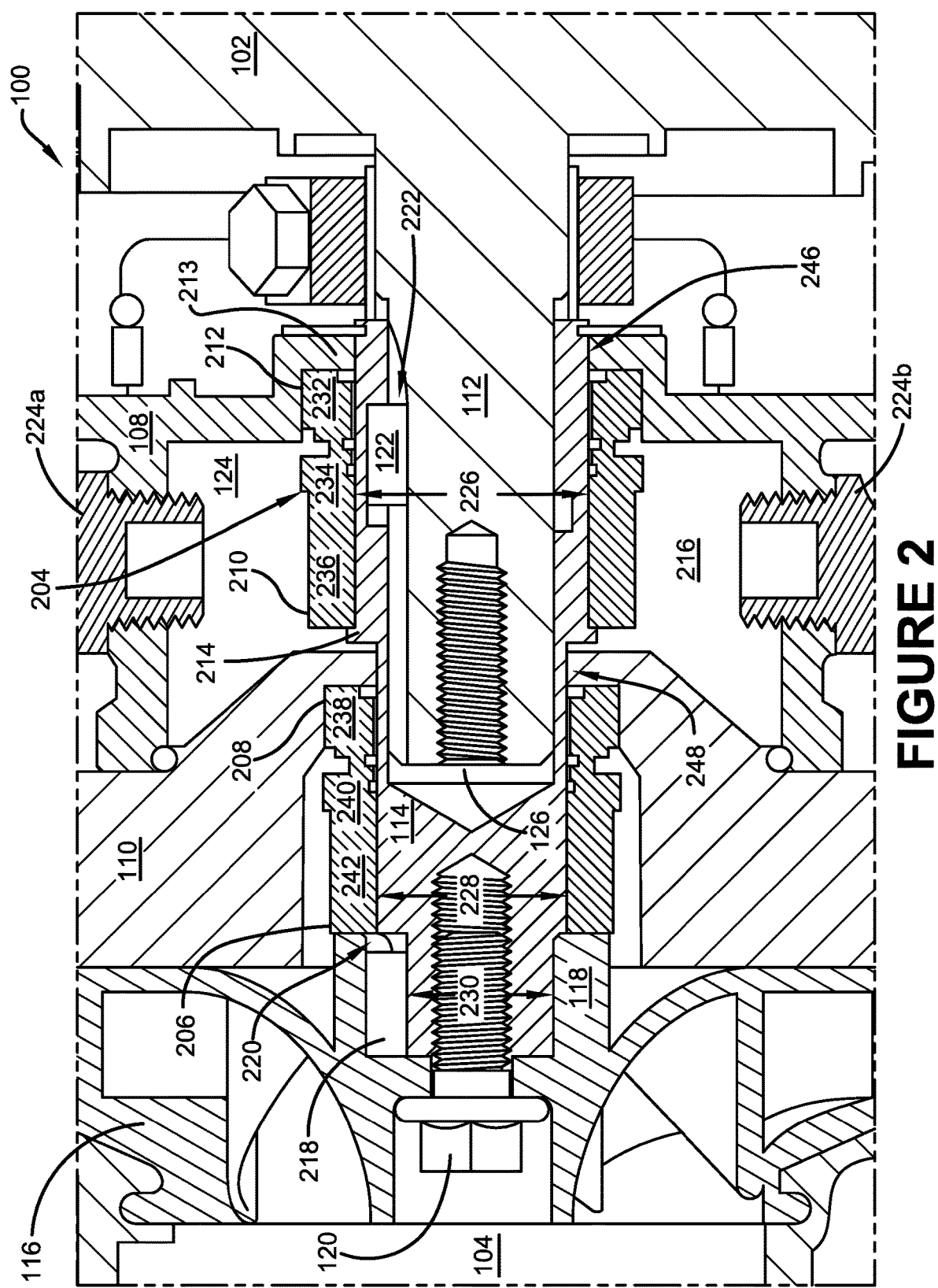
FIG. 2 is a component diagram illustrating one embodiment of an example tandem seal arrangement implemented in a pump.

Turning now to FIG. 2, a cross-sectional view of the interface between the power source 102 and the pump 104 is shown. In this implementation, a pair of tandem seals 202, 204 operably surround the motor shaft 112 and/or the adapter shaft 114. In this implementation, an outboard seal 204 is disposed forward around the adapter shaft. The outboard seal 204 can be constructed from, for example, ethylene propylene diene monomer (EDPM) rubber, FKM (e.g. VITON), or Nitrile/Buna. A front portion 212 of the outboard seal 204 is disposed adjacent to the rear surface of the front bracket 108 (e.g., motor bracket). A rear portion 210 of the outboard seal 204 can be retained in position around the adapter shaft 114 by a portion of the adapter shaft 114 that forms a seal retention stop 214 (e.g., a lip). The outboard seal 204 is configured to mitigate leakage of fluid from the reservoir 124, such as past the front bracket 108 (e.g., and into the power source 102).

The front portion 212 of the outboard seal 204 contacts a first (e.g., front) stop portion 213 of the front bracket 108 that is positioned axially in front of the outboard seal 204. In certain embodiments, the first stop portion 213 is integral with the rest of the front bracket 108. The outboard seal 204 disposed operably around the drive shaft 112, from front 212 to rear 210, is comprised of the stationary ring 232, the rotating ring 234 and the spring ring 236. The front surface of the stationary ring 232 contacts the rear surface of the front bracket 108 of the power source adapter. In one embodiment, the front bracket 108 includes a first stop portion 213, and the front surface of the outboard seal 204 (e.g. the front surface of the stationary ring 232) operably contacts the first stop portion 213 of the front bracket 108.

In this implementation, the bore 246 of the front bracket 108 comprises a through bore that operably provides an opening for the drive shaft 112. The stationary ring 232 is positioned adjacent to and around the bore 246, and the outer radial surface of the stationary ring 232 contacts the inner radial surface of the front bracket 108 on the power source adapter (front bracket 108). Further, in this implementation, the front surface of the rotating ring 234 is operably disposed in contact with the rear surface of the stationary ring 232. The spring ring 236 provides a biasing force that biases the rotating ring 234 forward toward the stationary ring 232. Additionally, in this implementation, the inner radial edge at the rear of the spring ring 236 is operably disposed in contact with the seal retention stop 214 (e.g., lip), which can extend radially outward from the adapter shaft 114. The seal retention stop 214 on the adapter shaft 114 can function to operably retain the outboard seal 204 in place at its rear end 210 (e.g., at the spring ring 236 side). In this implementation, the inner radial surface of the rotating ring 234 and the spring ring 236 are operably disposed in contact with the outer radial surface of the adapter shaft 114.

The adapter shaft 114 has a first diameter 226 at its front end. At the first diameter 226, there is a first keyway 222 that can receive the first key 122. As described above with reference to FIG. 1, when the first key 122 is inserted into the first keyway 222, the first key 122 is oriented axially along the drive shaft 112 and wedged in position so that the adapter shaft 114 and drive shaft 112 operably fixed together and engaged during rotational movement of the drive shaft 112. Extending radially outwards from the first diameter 226, at its rearward end, is the retention lip 214. To the rear of the retention lip 214, the adapter shaft 114 has a second diameter 228 that is radially thinner around the drive shaft 112.

The drive shaft 112 extends through a bore 248 on the front surface of the pump housing 106 through the rear bracket 110 (e.g., pump adapter bracket). At the rear portion of the drive shaft 112 the adapter shaft 114 extends from the drive shaft 112 into the pump housing 106, and ends at the impeller 116. As described above with reference to FIG. 1, the impeller 116 may indicate the rear end of the adapter shaft 114. In some implementations, the coupling fastener 120 (e.g. impeller bolt) extends through the axial center rear surface of the impeller 116 into the axial center of the adapter shaft 114. A pump shaft coupler 118 is operably engaged with the rear end of the adapter shaft 114, which couples the impeller 116 to the adapter shaft 114, which comprises a smaller third diameter 230 at the engagement to the pump shaft coupler 118. Of note, in this implementation, the first diameter 226 is larger than second diameter 228, and second diameter 228 is larger than third diameter 230.

The adapter shaft 114 and pump shaft coupler 118 can operably be held together using an impeller key 218 that wedges in axially into an impeller keyway 220 located axially between the pump shaft coupler and the adapter shaft 114. The impeller key 218 can be used to maintain the adapter shaft 114 and pump shaft coupler 118 operably fixed together and engaged during rotational movement of the drive shaft 112 and the resulting rotational movement of the adapter shaft 114. The pump shaft coupler 118 is disposed circumferentially around the rear end of the adapter shaft 114, and extends toward the front. In this implementation, the front end of the pump shaft coupler 118 is disposed in contact with the inboard seal 206. The front surface of the pump shaft coupler 118 operably contacts the rear surface of the inboard seal 206 to act as a stop to hold the rear of the inboard seal 206 during operation. A shoulder of the adapter shaft 114, which includes a transition from the second diameter 228 of the adapter shaft 114 to the third diameter 230 can also lie proximate the front end of the pump shaft coupler 118 and inboard seal 206.

The inboard seal 202 is located to the rear of the outboard seal 204 and in front of the pump 104, and is radially retained in its position around the adapter shaft 114 by the rear bracket 110. The inboard seal 202 primarily serves to prevent the high pressure liquids or gases from the pump body from leaking into the reservoir 124. The inboard seal 202 can be constructed from, for example, ethylene propylene diene monomer (EDPM) rubber, FKM (e.g. VITON), or Nitrile/Buna. The inboard seal 202 around the shaft, from front to rear, is comprised of the stationary ring 238, the rotating ring 240, and the spring ring 242. The inboard seal 202 uses the pressure from the pump body to more securely mitigate leakage of fluid past the seal 202. The front surface 208 of the stationary ring contacts the rear surface of the rear bracket 110. In one embodiment, the rear bracket 110 includes a second stop portion 215 that is positioned axially in front of the inboard seal 202. The front surface 208 of the inboard seal 202 (e.g. the front surface 208 of the stationary ring 238) contacts the second stop portion 215 of the rear bracket 110. In certain embodiments, the second stop portion 215 is integral with the rest of the rear bracket 110. The rear surface of the stationary ring 238 contacts the front surface of the rotating ring 240, this contact is enforced with the spring ring 242 acting with force on the rear surface of the rotating ring 240. The majority of the spring ring 242 rear surface is in contact with the front surface of the pump shaft coupler 118.

The most rear surface of the front bracket 108 (e.g. engine adapter) contacts the front surface of the rear bracket 110 that extends to the front from the pump housing 106. In another embodiment, the rear surface of the front bracket 108 contacts the front face of the pump 104. The contact location can be sealed with an O-ring to seal the reservoir 124.

In one embodiment, one or more of the walls (e.g., sides) and the front of reservoir 124 can be defined by the front bracket 108, and the rear of the reservoir 124 can be defined by the rear bracket 110. In another embodiment, the front of the reservoir 124 can be defined by the front bracket 108, and the one or more or the walls (e.g., sides) and the rear of the reservoir 124 can be defined by the rear bracket 110. The reservoir 124 can be positioned between the power source 102 and the pump 104 and can be filled with a fluid 216 to regulate heat and provide lubrication in the adapter shaft 114, the drive shaft 112, and/or the outboard seal 204. In one embodiment, the fluid 216 can be antifreeze for cooling mechanical seals. In another embodiment the reservoir 124 is filled with an appropriate cooling/lubricating oil. The reservoir 124 can have at least one threaded opening able to be closed off with a plug 224*a*. In another embodiment there are two threaded openings, a fill plug 224*a* and a drain plug 224*b*.

Figure 3:
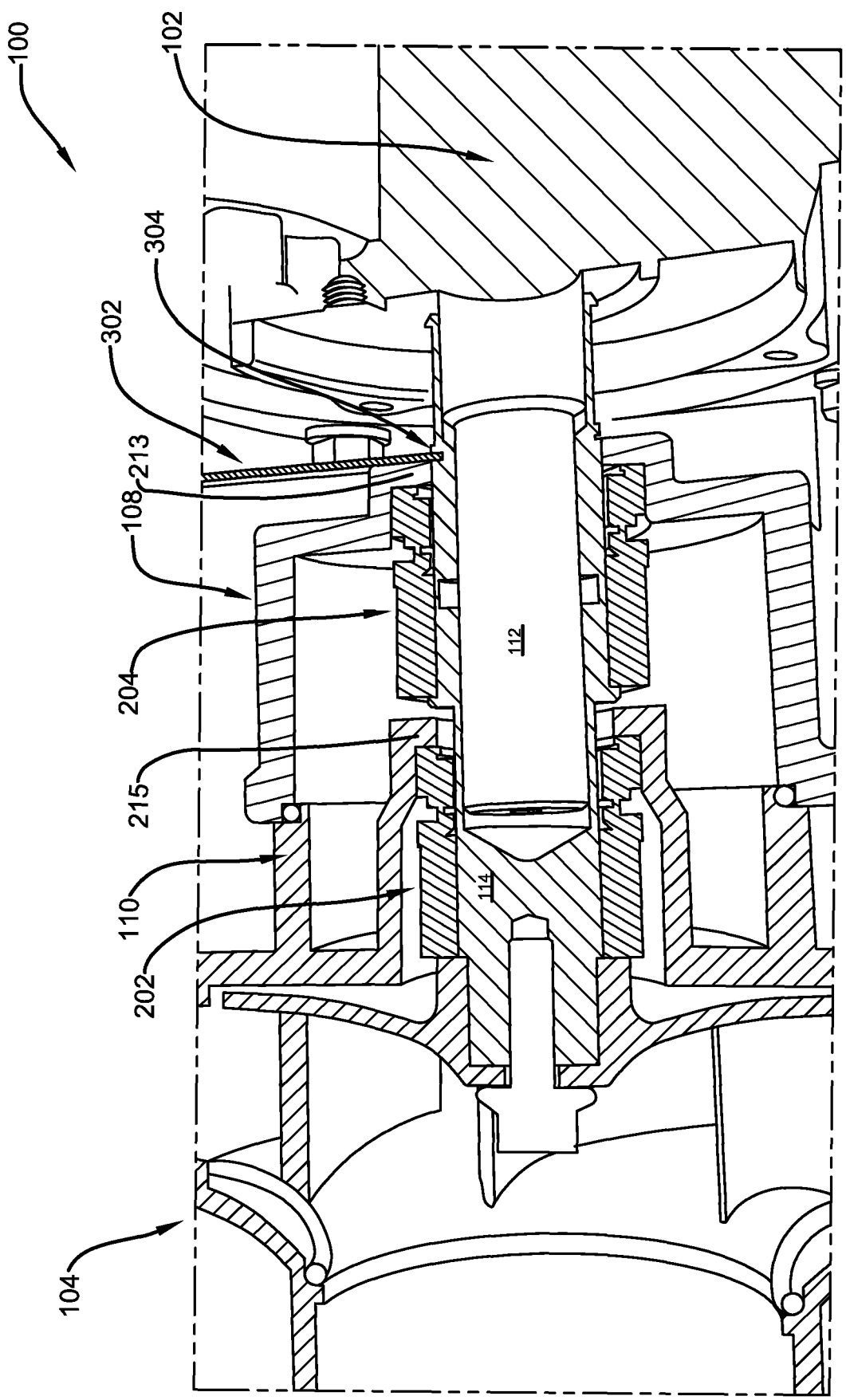
FIG. 3 is a component diagram illustrating one embodiment of an example tandem seal arrangement implemented in a pump and a corresponding spacer tool.

Turning now to FIG. 3, a spacer tool 302 is shown. In some implementations, during assembly of the pumping apparatus 100, a spacer tool 302 (e.g., long thin tool) can be placed at the mouth of the front bracket 108 bore (e.g. engine mounting bracket bore), in order to axially orient the engine drive shaft 112 during installation. In this example, the spacer tool can be inserted in a groove 304 in the adapter shaft 114. During installation, as the drive shaft 112 is inserted into the space 126 within the adapter shaft 114, the front surface of the front bracket 108 can come into contact with the spacer tool to indicate an appropriate power source 102 to pump 104 (e.g. engine-to-pump) mounting position. In this example, the spacer tool 302 is removed from the groove 304 when the power source 102 and pump 104 are operating.

In an exemplary embodiment, the pumping apparatus 100 can be used in an agricultural setting to transfer fluid such as water, fertilizer, or other agricultural chemicals. The configuration of the pumping apparatus 100 allows the pumping apparatus 100 to be run dry for some time (e.g. several minutes) without overheating or damaging the pump. This feature provides a user with time to prime the pump with fluid. Further, this feature allows the pumping apparatus 100 to be positioned above the fluid source (e.g., a well or reservoir), which could cause a delay in priming the pump while drawing the fluid up to the pump.

A method of pumping a fluid comprises providing the pump apparatus 100 as described with respect to FIGS. 1-3. The pump apparatus 100 can be assembled using the spacer tool 302 and/or the one or more keys as also described with respect to FIGS. 1-3. In certain embodiments, the pumping apparatus 100 can be primed with the fluid immediately upon operation. However, in certain circumstances, when the pumping apparatus 100 is not immediately primed, the pumping apparatus 100 may be operated dry for a period of time. While the pumping apparatus 100 is running dry, a seal fluid 216 contained within the reservoir 124 surrounding at least a portion of the outboard seal 204 cools and lubricates internal components of the pumping apparatus 100 such as the drive shaft 112, the adapter shaft 114, and/or the outboard seal 204. The seal fluid 216 cools and lubricates the internal components of the pumping apparatus 100 until the pumping apparatus 100 is primed with the fluid to be pumped. When the pumping apparatus 100 is primed with the fluid, the pumping apparatus 100 operates to transfer the fluid from a first location to a second location.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A pump apparatus comprising:
a power source comprising a front bracket and a drive shaft extending through the front bracket, wherein the drive shaft is rotatably engaged with the power source;
a pump comprising a rear bracket;
an adapter shaft that includes a first portion that radially surrounds the drive shaft and a second portion coupled to a pump shaft coupler;
an outboard seal radially surrounding the adapter shaft, the outboard seal is retained in place by the front bracket at a front end of the outboard seal; and
an inboard seal radially surrounding the adapter shaft and located axially between the outboard seal and the pump, the inboard seal is retained in place by the rear bracket at a front end of the inboard seal.

2. The pump apparatus of claim 1, wherein the adapter shaft further includes a retention lip that extends radially outwards from the adapter shaft, and the outboard seal is further retained in place by the retention lip at a rear end of the outboard seal.

3. The pump apparatus of claim 1, wherein the inboard seal is further retained in place by the pump shaft coupler at a rear end of the inboard seal.

4. The pump apparatus of claim 1, wherein the inboard seal is retained in place radially by the rear bracket.

5. The pump apparatus of claim 1, wherein the pump apparatus further comprises a reservoir surrounding at least a portion of the outboard seal, and the reservoir is at least partially defined by the front bracket and the rear bracket.

6. The pump apparatus of claim 5, wherein the reservoir contains an antifreeze.

7. The pump apparatus of claim 1, further comprising a first key inserted into a first keyway, wherein the first key keeps the adapter shaft and the drive shaft operably fixed together and engaged during rotational movement of the drive shaft.

8. The pump apparatus of claim 1, further comprising an impeller key inserted into an impeller keyway, wherein the impeller key keeps the adapter shaft and pump shaft coupler operably fixed together and engaged during rotational movement of the drive shaft.

9. The pump apparatus of claim 1, wherein the pump shaft coupler is axially coupled with the adapter shaft by a coupling fastener.

10. The pump apparatus of claim 1, wherein the adapter shaft comprises a first diameter, a second diameter, and a third diameter, wherein the first diameter is greater than the second diameter, and the second diameter is greater than the third diameter.

11. The pump apparatus of claim 10, wherein the outboard seal surrounds the first diameter and the inboard seal surrounds the second diameter.

12. The pump apparatus of claim 10, wherein the pump shaft coupler is coupled to the third diameter of the adapter shaft.

13. A method of pumping a fluid, comprising:
providing a pump apparatus, wherein the pump apparatus comprises:
a power source comprising a front bracket and a drive shaft extending through the front bracket, wherein the drive shaft is rotatably engaged with the power source;
a pump comprising a rear bracket;
an adapter shaft that includes a first portion that radially surrounds the drive shaft and a second portion coupled to a pump shaft coupler;
an outboard seal radially surrounding the adapter shaft, the outboard seal is retained in place by the front bracket at a front end of the outboard seal; and
an inboard seal radially surrounding the adapter shaft and located axially between the outboard seal and the pump, the inboard seal is retained in place by the rear bracket at a front end of the inboard seal;
priming the pump apparatus with the fluid; and
transferring the fluid from a first location to a second location by operating the pump apparatus.

14. The method of claim 13, further comprising:
prior to priming the pump apparatus, operating the pump apparatus dry; and
cooling and lubricating at least one of the drive shaft, the adapter shaft, or the outboard seal with a seal fluid contained within a reservoir surrounding at least a portion of the outboard seal.

15. The method of claim 13, wherein the fluid is an agricultural fertilizer.

16. The method of claim 13, wherein the fluid is water.

17. The method of claim 13, wherein at least one of the inboard seal or the outboard seal is constructed of ethylene propylene diene monomer (EPDM) rubber, FKM, or nitrile rubber.

18. The method of claim 13, further comprising:
assembling the pump apparatus by:
inserting a spacer tool into a groove in the adapter shaft;
inserting the drive shaft into a space within the adapter shaft until a front surface of the front bracket contacts the spacer tool; and
removing the spacer tool from the groove.

19. The method of claim 18, wherein assembling the pump apparatus further comprises:
inserting a key into a keyway, wherein the key keeps the adapter shaft and the drive shaft operably fixed together and engaged during rotational movement of the drive shaft.

20. A pump apparatus comprising:
a power source comprising a front bracket, and a drive shaft extending through the front bracket;
a pump comprising an impeller and a rear bracket;
an adapter shaft rotatably coupled with the drive shaft and the impeller, the adapter shaft includes a retention lip that extends radially outwards from the adapter shaft;
an outboard seal radially surrounding the adapter shaft, the outboard seal is retained in place at a front end of the outboard seal by a first stop portion of the front bracket that is positioned axially in front of the outboard seal, and by the retention lip at a rear end of the outboard seal; and
an inboard seal radially surrounding the adapter shaft and located axially between the outboard seal and the pump, the inboard seal is retained in place at a front end of the inboard seal by a second stop portion of the rear bracket that is positioned axially in front of the inboard seal.

* * * * *